United States Patent
Yi et al.

(10) Patent No.: US 11,886,589 B2
(45) Date of Patent: Jan. 30, 2024

(54) PROCESS WRAPPING METHOD FOR EVADING ANTI-ANALYSIS OF NATIVE CODES, RECORDING MEDIUM AND DEVICE FOR PERFORMING THE METHOD

(71) Applicant: Foundation of Soongsil University-Industry Cooperation, Seoul (KR)

(72) Inventors: Jeong Hyun Yi, Seoul (KR); Yong Gu Shin, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 422 days.

(21) Appl. No.: 17/287,056

(22) PCT Filed: Jan. 28, 2021

(86) PCT No.: PCT/KR2021/001131
§ 371 (c)(1),
(2) Date: Apr. 20, 2021

(87) PCT Pub. No.: WO2022/114391
PCT Pub. Date: Jun. 2, 2022

(65) Prior Publication Data
US 2022/0164446 A1 May 26, 2022

(30) Foreign Application Priority Data
Nov. 26, 2020 (KR) .......... 10-2020-0161386

(51) Int. Cl.
*G06F 21/56* (2013.01)
*G06F 8/41* (2018.01)
(Continued)

(52) U.S. Cl.
CPC ............ *G06F 21/566* (2013.01); *G06F 8/427* (2013.01); *G06F 21/54* (2013.01); *G06F 21/562* (2013.01); *G06F 2221/033* (2013.01)

(58) Field of Classification Search
CPC ........ G06F 21/566; G06F 8/427; G06F 21/54; G06F 21/562; G06F 2221/033
(Continued)

(56) References Cited

U.S. PATENT DOCUMENTS

| | | | | |
|---|---|---|---|---|
| 2012/0272072 | A1* | 10/2012 | Lee | G06F 21/10 713/190 |
| 2018/0157808 | A1* | 6/2018 | Jeon | G06F 21/125 |
| 2018/0307837 | A1* | 10/2018 | Ahn | G06F 21/6218 |

FOREIGN PATENT DOCUMENTS

| | | | | |
|---|---|---|---|---|
| CN | 110795734 | A * | 2/2020 | G06F 21/562 |
| KR | 10-1545272 | B1 | 8/2015 | |

(Continued)

OTHER PUBLICATIONS

Lei Xue; Happer: Unpacking Android Apps via a Hardware-Assisted Approach; IEEE: 2020; pp. 1641-1658.*
(Continued)

*Primary Examiner* — Monjur Rahim
(74) *Attorney, Agent, or Firm* — Stein IP, LLC

(57) ABSTRACT

A process wrapping method for bypassing native code anti-analysis includes receiving an execution instruction intended to run in an application from an Android framework when the application starts, extracting metadata of string and method from a compiled OAT file using an oatdump tool in the Android framework, determining if anti-analysis techniques are applied by comparing with information of a database (DB) based on the transmitted execution instruction and the extracted metadata, modifying the execution instruction based on the determined information when the anti-analysis technique is applied, and sending (Continued)

the modified execution instruction back to the Android framework. Accordingly, it is possible to provide an environment in which malicious applications to which anti-analysis techniques are applied can be easily analyzed.

13 Claims, 14 Drawing Sheets

(51) Int. Cl.
*G06F 21/54* (2013.01)
*G06F 21/57* (2013.01)

(58) Field of Classification Search
USPC .............................................................. 726/4
See application file for complete search history.

(56) References Cited

FOREIGN PATENT DOCUMENTS

| KR | 10-1602881 B1 | 3/2016 | |
|---|---|---|---|
| KR | 10-2017-0068814 A | 6/2017 | |
| KR | 10-1803890 B1 | 12/2017 | |
| KR | 10-1920597 B1 | 11/2018 | |
| KR | 10-1976992 B1 | 5/2019 | |
| KR | 10-2019-0090810 A | 8/2019 | |
| WO | WO-2019070675 A1 * | 4/2019 | ............. G06F 21/52 |

OTHER PUBLICATIONS

Geonbae NA et al. "Comparative Analysis of Mobile App Reverse Engineering Methods on Dalvik and ART", Journal of Internet Services and Information Security (JISIS), vol. 6, No. 3 (Aug. 2016), pp. 27-3.

Sunjun Lee et al. "Design and Implementation of Anti-reversing Code Evasion Framework for Intelligent Malware Analysis" School of Software, Soongsil University, Oct. 31, 2018, Republic of Korea.

Scimark2, https://math.nist.gov/scimark2/about.html, Access On: Oct. 2020.

Haehyun Cho et al. "DexMonitor: Dynamically Analyzing and Monitoring Obfuscated Android Applications," IEEE Access, vol. 6, pp. 71229-71240, 2018.

\* cited by examiner

| No. | Start off-set | End off-set | Method Name |
|---|---|---|---|
| 1 | 0x297 01c | 0x297 060 | Void android.support.v4.os.ResultReceiver$1.<init>( ) |
| 2 | 0x297 07c | 0x297 0e8 | android.support.v4.os.ResultReceiver android. support.v4.os.ResultReceiver$1.createFromParcel ( android.os.Parcel ) |
| ... | ... | ... | ... |
| 111 92 | 0x510 19c | 0x510 3f0 | Void com.example.sample.MainActivity. onCreate ( android.os.Bundle ) |

FIG. 4

Before

```
08 th | ------ IMark ( 0x53095C44, 2, 1 ) ------
09 th | IR-NoOp
10 th | PUT ( 396 ) = 0x0 : I32
11 th | t51 = CmpEQ32 ( t2, 0x0 : I32 )
12 th | if ( t51 ) { PUT(68) = 0x53095C83 : I32 ; exit-Boring }
13 th | PUT ( 68 ) = 0x53095C47 : I32
```

After

```
08 th | ------ IMark ( 0x53095C44, 2, 1 ) ------
09 th | IR-NoOp
10 th | PUT ( 396 ) = 0x0 : I32
11 th | t51 = CmpEQ32(t2, 0x1 : I32)
12 th | if (t51) { PUT ( 68 ) = 0x53095C83 : I32 ; exit-Boring }
13 th | PUT ( 68 ) = 0x53095C47 : I32
```

Before

```
Function : boolean com.example.sample.MainActivity.checkForSuBinary ( )
00 th | ------ IMark ( 0x11FBF00C, 7, 0 ) ------85842400E0FFFF
01 th | t18 = GET : I32 ( 24 )
02 th | IR-NoOp
03 th | t2 = GET : I32 ( 8 )
04 th | IR-NoOp
05 th | IR-NoOp
06 th | ------ IMark ( 0x11FBF013, 3, 0 ) ------83EC2C
07 th | t4 = Sub32 ( t18, 0x2C : I32 )
08 th | PUT ( 24 ) = t4
09 th | PUT ( 68 ) = 0x11FBF016 : I32

. . .

51 th | ------ IMark ( 0x11FBF037, 2, 0 ) ------7433
52 th | t48 = CmpEQ32 ( t39, 0x0 : I32 )
53 th | t47 = 1Uto32 ( t48 )
54 th | t45 = t47
55 th | t49 = 32to1 ( t45 )
56 th | t40 = t49
57 th | if (t40) { PUT ( 68 ) = 0x11FBF06C : I32 ; exit-Boring }
```

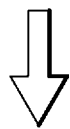

After

```
Function : boolean com.example.sample.MainActivity.checkForSuBinary ( )
00 th | PUT ( 8 ) = 0x0 : I32
01 th | t50 = 0x11D46055 : I32
```

FIG. 10

| Apk | Signature |
|---|---|
| 1049 | "/ data / local", "/ data", "su", "Emulator", "goldfish", "000000000000000" . . . |
| 1191 | "su", "android.os.SystemProperties", "/ dev" |
| 638 | "ro.product.device", "android.os.SystemProperties", "ro.product.model" . . . |
| 420 | "000000000000000", "Emulator", "generic", "Android SDK built for x86", "Genymotion" . . . |
| . . . | |
| 1498 | "/ data", "su", "000000000000000", "/ cache" |

FIG. 11

```
public static boolean a ( Context arg6 ) {
    boolean v1 = false ;
    boolean v4 = arg6.getSystemService ("phone").getDeviceId ( ).equals ( "000000000000000" ) ;
    int v0 = ( Build.MODEL.contains ("Emulator") )
        | | . . .
        | | ( Build.MODEL.contains ("Android SDK build for x86") )
        | | ( Build.MANUFACTURER.contains ("Genymotion") ) ? 1 : 0 ;
    int v3 = ! Build.BRAND.startsWith ("generic") ) | | ! Build.DEVICE.startsWith ("generic") ? 0 :1 ;
    if ( ( v4 ) | | v0 ! = 0 | | v3 ! = 0 ) {
        v1 = true ;
    }
    return v1 ;
}
```

FIG. 12

```
object : / data / dalvik-cache / x86 /
data@app@zzzzzz.zzzzzz.cccccc-1@base.apk@classes.dex
Function : boolean n.a ( android.content.context )
strlen : 0x8
string data : "Emulator"
found signature !
Emulator changed to ōmulator
```

FIG. 13

```
public void run( ) {
    int v0_2 ;
    String v0_1 ;
    super.run ( ) ;
    JSONObject v2 = new JSONObject ( ) ;
...

lable_185 :
        v2.put ( "type", "load" ) ;
        v2.put ( "number", v3.getString ( "tel" ) ) ;
        v2.put ( "text",   v3.getString ( "body" ) ) ;
        v2.put ( "data",   v3.getString ( "time" ) ) ;
        goto lable_142 ;
    lable_235 :
        v2.put ( "type", "cc" ) ;
        if ( q.a ( v3 . getString ("card") ) ) {
            v2.put ( "card",  v3.getString ( "card" ) ) ;
            v2.put ( "month", v3.getString ( "month" ) ) ;
            v2.put ( "year",  v3.getString ( "year" ) ) ;
            v2.put ( "cvc",   v3.getString ( "cvc" ) ) ;
            goto lable_142 ;
        }
...

Before Bypass

. . .

object : / system / vendor / lib / egl /
libGLESv2_swiftshader.so
returned : DC07800

After Bypass

. . .

object : / system / vendor / lib / egl /
libGLESv2_swiftshader.so
returned : DC07800

. . .

**object : / data / dalvik-cache / x86 /
data@app@zzzzzz.xxxxxx.cccccc-1@base.apk@classes.dex
Function : int n.a ( android.content.Context )
returned : 0
Function : void i.run ( )**

. . .

**Function : void
zzzzzz.xxxxxx.cccccc.MAC.onCreate ( android.os.Bundle )
strlen : 0x23
string data : "android.app.action.ADD_DEVICE_ADMIN"**

PROCESS WRAPPING METHOD FOR EVADING ANTI-ANALYSIS OF NATIVE CODES, RECORDING MEDIUM AND DEVICE FOR PERFORMING THE METHOD

TECHNICAL FIELD

The present disclosure relates to a process wrapping method for bypassing native code anti-analysis and a recording medium and a device for performing the same, and more particularly, to technology that disables anti-analysis techniques by instrumenting the native code of an OAT file used in ART at the instruction level through process wrapping.

BACKGROUND ART

Recently, with the growth of the IoT market, IoT devices are increasing worldwide, and it is predicted that the total will reach 25 billion by 2021. In this environment, mobile devices are also growing rapidly, and it is predicted that the estimated production volume of smartphones will amount to about 1.7 billion in 2020 and about 40% of the world population will possess smartphones in 2021.

As of July 2020, Android™ has 74.6% share in the smartphone market and is the most widely used mobile operating system (Android™ is a trademark of Goodie, LLC, and hereinafter referred to as "Android"). With the growth of Android, Android malicious code is also quickly increasing, and it is said that about 8 Android malicious applications per second on average are being distributed.

As the number of malicious applications is increasing quickly, techniques for protecting applications are also developing, and thus it is becoming more difficult to analyze malicious applications. Code protection techniques such as obfuscation and Java Reflection and anti-analysis techniques such as anti-emulating and anti-debugging are used to protect applications from malicious code.

The code protection techniques such as obfuscation and Java Reflection have been developed to protect applications from static analysis. These techniques can conduct analysis through dynamic analysis tools, and the anti-analysis techniques such as anti-emulating and anti-debugging have been developed to evade dynamic analysis.

The anti-analysis techniques check the current execution environment, and when specific environments are detected, do not normally execute or come to an end. That is, the anti-analysis techniques exploit the environmental features appearing when incorporating dynamic analysis techniques into systems, not the limits of dynamic analysis techniques themselves.

To analyze malicious code, a large amount of time and experiences of analyzers are required, and this signifies that it is impossible to deal with malicious code rapidly.

Accordingly, methods for behavior analysis of malicious applications which bypass the application protection techniques rapidly are necessary.

In addition to the development of protection techniques, as the runtime in Android switched to ART runtime, the main execution code of applications changes from bytecode to native code, and ART runtime replaces Dalvik virtual machine. These format changes make it difficult to use the existing Dalvik based analysis tools, and there is a need for new analysis tools.

In other words, with the development of the anti-analysis techniques such as obfuscation, integrity checking, and emulator detection, it is very difficult to analyze applications using analysis tools employing emulators or involving damaging the integrity of the applications. Additionally, tools working in a manner of evading the detection by the anti-analysis techniques have a comparatively limited range of analysis targets.

RELATED LITERATURES

Patent Literatures (Patent Literature 1) KR 10-1976992 B1
(Patent Literature 2) KR 10-1602881 B1

Non-Patent Literatures (Non-Patent Literature 1) SciMark2, https://math.nist.gov/scimark2/about.html, Access On: October, 2020.
(Non-Patent Literature 2) H. Cho, J. H. Yi, and G. J. Ahn, "DexMonitor: Dynamically Analyzing and Monitoring Obfuscated Android Applications," IEEE Access, vol. 6, pp. 71229-71240, 2018.

DISCLOSURE

Technical Problem

In view of this circumstance, the present disclosure is directed to providing a process wrapping method for bypassing native code anti-analysis.

The present disclosure is further directed to providing a recording medium having recorded thereon a computer program for performing the process wrapping method for bypassing native code anti-analysis.

The present disclosure is further directed to providing a device for performing the process wrapping method for bypassing native code anti-analysis.

Technical Solution

To achieve the above-described object of the present disclosure, a process wrapping method for bypassing native code anti-analysis according to an embodiment includes receiving an execution instruction intended to run in an application from an Android framework when the application starts, extracting metadata of string and method from a compiled OAT file using an oatdump tool in the Android framework, determining if anti-analysis techniques are applied by comparing with information of a database (DB) based on the transmitted execution instruction and the extracted metadata, modifying the execution instruction based on the determined information when the anti-analysis technique is applied, and sending the modified execution instruction back to the Android framework.

In an embodiment of the present disclosure, the process wrapping method for bypassing native code anti-analysis may further include preprocessing for extracting the necessary metadata based on installed information of the application intended to analyze.

In an embodiment of the present disclosure, preprocessing for extracting the metadata may include generating mapping information using the metadata necessary to identify the running method based on offset, extracting the string mapped to each unique ID as the metadata, and executing a predefined wrapper process and then loading classes and resources necessary to run the application.

In an embodiment of the present disclosure, receiving the execution instruction from the Android framework may include translating native code compiled to run into IR and managing the IRs per Basic Block (BB).

In an embodiment of the present disclosure, determining if the anti-analysis techniques are applied may include detecting the anti-analysis techniques by comparing signature including the string used in the instruction, a method name of a current BB or a next BB and a used library or an instruction set of a specific sequence with signature including string and method name used in a malicious application stored in the DB.

In an embodiment of the present disclosure, modifying the execution instruction based on the determined information may include changing an execution flow of the instruction by converting an additional instruction into IR and inserting between instructions or changing a constant value stored in the instruction.

In an embodiment of the present disclosure, modifying the execution instruction based on the determined information may include changing an execution flow of the instruction by inserting IR that changes a value of a specific register after a return value of the method is stored or changes the register value after execution.

To achieve another object of the present disclosure, a computer-readable storage medium according to an embodiment has recorded thereon a computer program for performing the process wrapping method for bypassing native code anti-analysis.

To achieve still another object of the present disclosure, a process wrapping device for bypassing native code anti-analysis according to an embodiment includes an execution code monitor which receives an execution instruction intended to run in an application from an Android framework when the application starts and sends a modified execution instruction back to the Android framework, a symbol extractor which extracts metadata of string and method from a compiled OAT file using an oatdump tool in the Android framework, an anti-analysis recognizer which determines if anti-analysis techniques are applied by comparing with information of a DB based on the execution instruction transmitted by the execution code monitor and the metadata extracted by the symbol extractor, and an execution code modifier which modifies the execution instruction to which the anti-analysis technique is applied based on the information determined by the anti-analysis recognizer and transmits to the execution code monitor.

In an embodiment of the present disclosure, the symbol extractor may include a method metadata extractor which generates mapping information using the metadata necessary to identify the running method based on offset, a string metadata extractor which extracts the string mapped to each unique ID as the metadata in preprocessing, and an environment configurator which executes a predefined wrapper process and then loads classes and resources necessary to run the application.

In an embodiment of the present disclosure, the process wrapping device for bypassing native code anti-analysis may further include a space manager module and an emulation module which is responsible for memory management and loading and linking and plays a role in transmitting the instruction to a central processing unit (CPU) according to an instrumentation result.

In an embodiment of the present disclosure, the space manager module may include a loader & linker module which performs a task for library loading and linking necessary to run a program, and a stack manager module and a heap manager module which manage spaces used in app_process and the application.

In an embodiment of the present disclosure, the execution code monitor may translate native code compiled to run into IR and manage the IRs per Basic Block (BB).

In an embodiment of the present disclosure, the anti-analysis recognizer may detect the anti-analysis techniques by comparing signature including the string used in the instruction, a method name of a current BB or a next BB and a used library or an instruction set of a specific sequence with signature including string and method name used in a malicious application stored in the DB.

In an embodiment of the present disclosure, the execution code modifier may include an instruction replacer to change an execution flow of the instruction by converting an additional instruction into IR and inserting between instructions or changing a constant value stored in the instruction.

In an embodiment of the present disclosure, the execution code modifier may include a register replacer to change an execution flow of the instruction by inserting IR that changes a value of a specific register after a return value of the method is stored or changes the register value after execution.

Advantageous Effects

According to the process wrapping method for bypassing native code anti-analysis, it is possible to easily analyze malicious applications to which anti-analysis techniques are applied using the existing analysis system by creating an environment in which the anti-analysis techniques that make it difficult to use the existing analysis system are bypassed to run programs. Additionally, it is possible to reduce the time required to deal with the existing malicious applications as well as new malicious applications.

DESCRIPTION OF DRAWINGS

FIG. 4 is a diagram showing an example of method information extracted from an OAT file that is a part of the result of a symbol extractor.

FIG. 10 is a diagram showing a part of method implementing check for "su" binary, one of rooting detection techniques.

FIG. 11 shows a table showing a part of signature of anti-analysis technique of a bypassed malicious application detected using the proposed scheme.

FIG. 12 is a diagram showing a part of anti-emulating code applied to a malicious application.

FIG. 13 is a diagram showing a part of log indicating a result of recognizing strings used in method determined by anti-emulating as signature and replacing the corresponding string by a different string at the time of resolving through ART.

FIG. 14 is a diagram showing a part of code running to steal information in a malicious application.

FIG. 15 is a diagram showing a difference in log made by a corresponding method executed by bypassing function.

BEST MODE

Figure 1:
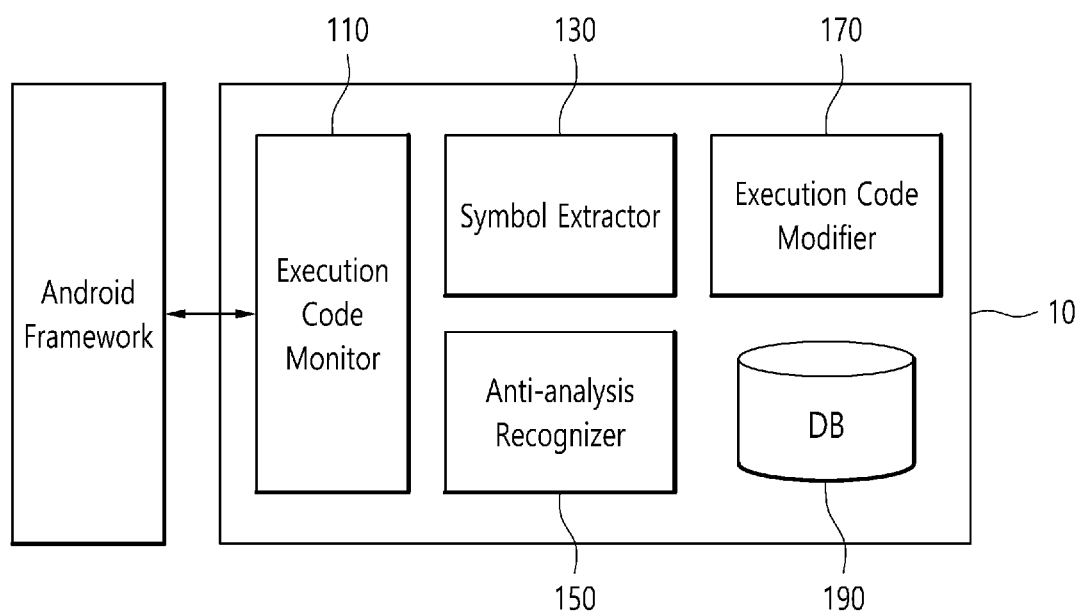
FIG. 1 is a block diagram of a process wrapping device for bypassing native code anti-analysis according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures, and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

Figure 2:
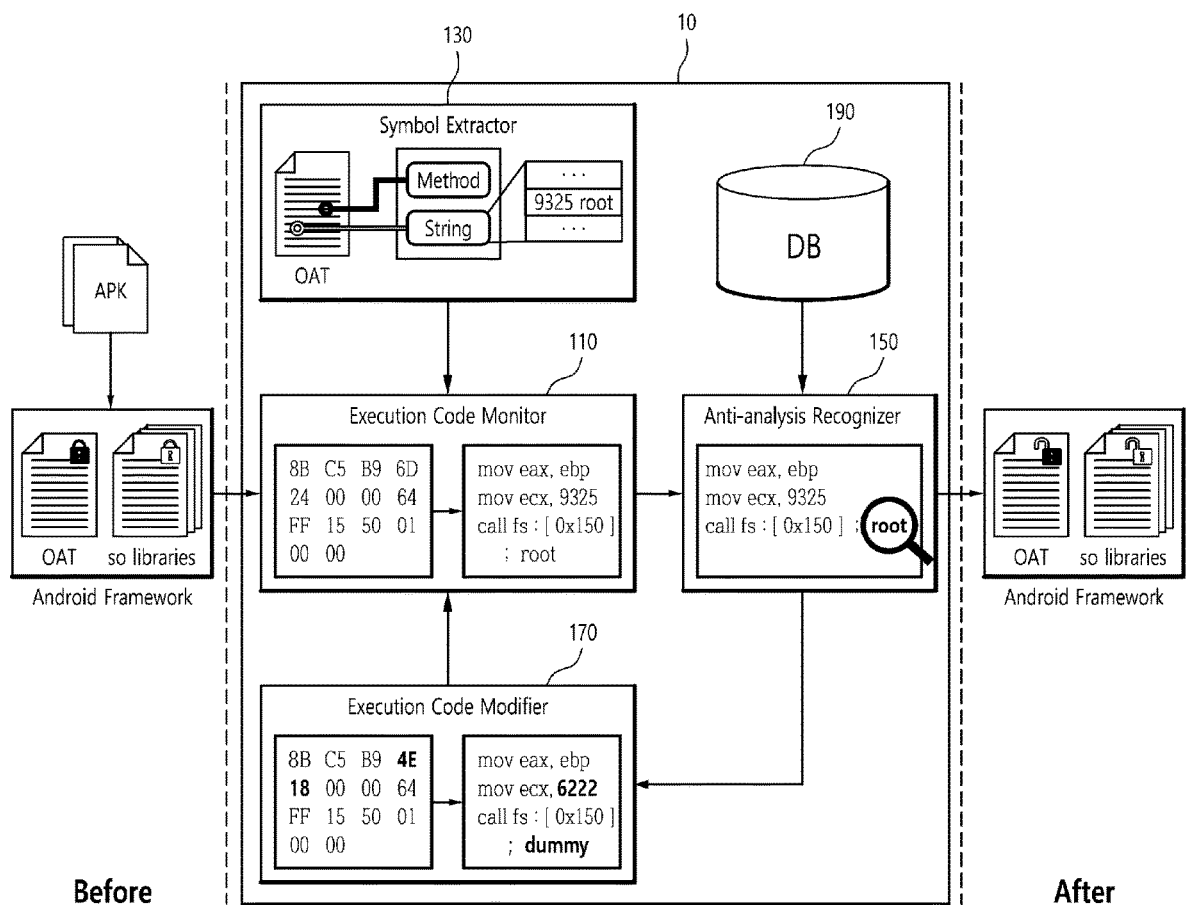
FIG. 2 is a diagram illustrating an operation of the process wrapping device for bypassing native code anti-analysis of FIG. 1.

FIG. 1 is a block diagram of a process wrapping device for bypassing native code anti-analysis according to an embodiment of the present disclosure. FIG. 2 is a diagram illustrating an operation of the process wrapping device for bypassing native code anti-analysis of FIG. 1.

The process wrapping device 10 for bypassing native code anti-analysis (hereinafter referred to as device) according to the present disclosure proposes a tool for instrumenting an application at the native level to automatically bypass the rooting detection, virtualization detection and debugger detection.

The present disclosure does not use an instrumentator module in the system, and instruments all the instructions of the application by wrapping the application using an external instrumentation program. In this instance, anti-analysis techniques are recognized based on the instrumented information and the recognized routines are interrupted.

To bypass the anti-analysis techniques, it is necessary to interrupt the routines that detect the rooting environment, emulator environment and debugger environment. In this instance, when detection routines are found, a task of forcibly changing to a normal program execution flow is necessary, and this task may be performed by manipulating a variable that stores a result or ignoring the routine itself. The present disclosure proposes the device of the structure shown in FIG. 1 to automatically bypass the anti-analysis techniques.

Referring to FIG. 1, the device 10 according to the present disclosure includes an execution code monitor 110, a symbol extractor 130, an anti-analysis recognizer 150 and an execution code modifier 170. The device 10 may further include a database 190 outside or inside.

The device 10 of the present disclosure may run software (application) for performing the process wrapping for bypassing native code anti-analysis thereon, and the execution code monitor 110, the symbol extractor 130, the anti-analysis recognizer 150, the execution code modifier 170 and the database 190 may be controlled by the software for performing the process wrapping for bypassing native code anti-analysis running on the device 10.

The device 10 may be a separate terminal or modules of the terminal. Additionally, the execution code monitor 110, the symbol extractor 130, the anti-analysis recognizer 150, the execution code modifier 170 and the database 190 may be formed as an integrated module or at least one module. However, to the contrary, each element may be formed as a separate module.

The device 10 may be mobile or fixed. The device 10 may be in the form of a server or an engine, and may be interchangeably used with a device, an apparatus, a terminal, user equipment (UE), a mobile station (MS), a wireless device and a handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The execution code monitor 110 fetches instructions stored in a compiled OAT file that can be immediately used in the central processing unit (CPU) from the Android framework. Additionally, the execution code monitor 110 performs a function of sending the instrumentation result back to the framework. ART runtime is used starting from Android 4.4, and ART generates an OAT file as a result of compiling Dex.

When the bytecode of a DEX file is executed as the main execution code, the symbol extractor 130 runs on the Dalvik virtual machine, and in this instance, information about class name, method name, etc. may be acquired through the Dalvik virtual machine. However, since it is difficult to acquire information during the execution using only the compiled instruction, information about string and method used by the application is extracted.

The anti-analysis recognizer 150 determines if anti-analysis techniques are applied based on the DB on the basis of the information refined by the execution code monitor.

The execution code modifier 170 disables the anti-analysis techniques by changing or inserting the instruction based on the information recognized by the anti-analysis recognizer.

FIG. 2 is a diagram showing the work flow of the proposed automatic anti-analysis bypass tool.

Android using ART creates an OAT file by compiling DEX files after installation. The present disclosure targets the compiled OAT file, and analyzes all machine instructions directly executed through the CPU including not only code compiled by Java Native Interface (JNI) but also dynamic libraries.

The symbol extractor 130 extracts the OAT file of the installed target application using the oatdump tool present in the Android framework. The extracted information includes information about all the compiled Dex files. The oatdump dumps information of class in each Dex file and method inside the class, and the symbol extractor extracts only information about string and method based on the dumped information.

When the application to be analyzed is wrapped and executed by the proposed automatic anti-analysis bypass tool, the code intended to run in the application is transferred to the execution code monitor 110 at the start of the application. The execution code monitor 110 interprets the transferred execution code, converts to the human-readable level and transfers to the anti-analysis recognizer 150. In this instance, metadata of the code intended to run based on the extracted symbol information is additionally provided together.

The anti-analysis recognizer 150 may identify which function is executed and which string is used by referring to the information interpreted by the execution code monitor 110, and compare with the database 190 to determine if anti-analysis techniques are applied. When anti-analysis techniques are recognized, the recognized information and information about a method for bypassing is transmitted to the execution code modifier 170.

The execution code modifier 170 modifies the execution instruction based on the information about the recognized anti-analysis techniques transferred from the anti-analysis recognizer 150 and the information about the bypassing method. The change is applied to the modified instruction which is then sent back to the Android framework through the execution code monitor 110 to run the modified instruction.

FIG. 4 shows an example of the method information extracted from the OAT file that is a part of the result of the symbol extractor.

Referring to FIG. 4, with a reference address of the OAT file as a start address, it has information about the start address and the end address of method and the name of method. Since a material type for a return value of a corresponding function is specified in front of the method name, the result of the corresponding method can be easily inferred.

The method name and the material type of the return value is used as important information to recognize anti-analysis techniques. Typically, when obfuscated, the string extracted by the symbol extractor may be a non-readable string, and a result value of an obfuscation function having the string as the return value is outputted as a readable string, and thus it is necessary to recognize and bypass anti-analysis techniques using the symbol information and the dynamic execution result together.

The present disclosure installs an application through pre-processing, and parses necessary information. Subsequently, the present disclosure runs the installed application by performing an instrumentation tool by process wrapping to bypass anti-analysis techniques. The implementation of the instrumentation tool may use a dynamic binary instrumentation framework. Most of dynamic binary instrumentation frameworks support to easily build a dynamic binary analysis tool and support to implement an instrumentation function for compiled binary.

The present disclosure uses and implements Valgrind among a variety of dynamic binary instrumentation frameworks available in Android. The instrumentation tool automatically disables anti-analysis techniques based on the database generated during pre-processing and runs the application by the disabled result. Since the analysis tool works in a manner of wrapping the entire execution of the application, there is no need for any additional task for separate additional debugging module installation and rooting, emulator modification, etc.

Additionally, it provides the same result as the result of execution on the actual user device by disabling the analysis environment detection function even though an environment in which detection is possible by anti-analysis techniques. In this instance, the instruction of the application executed and the information about the anti-analysis techniques detected is recorded in the format of log.

The anti-analysis techniques detect the environment of the application and block the application from running in a specific environment. However, the environment detection activities are also written in code and performed by checking before the application runs. Accordingly, when the entire execution until the application runs is instrumented, it is possible to identify if anti-analysis techniques are applied.

Since determination can be made as to whether anti-analysis techniques are applied by detecting the activities executed before the application runs, the anti-analysis techniques are disabled by interrupting the corresponding routine. To interrupt the corresponding routine, the used string or method is changed to prevent the accurate recognition of the environment intended to detect.

Referring to FIG. 2, when the application is installed using APK as input, there are an OAT file produced by compiling DEX of APK and dynamic shared libraries used in the OAT file. The OAT file contains mapping of the compiled native execution code and information of all symbols used in the corresponding code, and metadata of method and string is extracted using the OAT file according to the present disclosure.

In an embodiment, when the application is wrapped and executed by the proposed scheme, not through zygote, the proposed scheme fetches instructions and overlays information onto the instructions based on the previously extracted information. Subsequently, it checks the instructions to check if the corresponding instructions are relevant to anti-analysis techniques based on the signature database, and when relevant, bypassing is performed. The bypassed code is converted back to an executable native code and executed.

Figure 3:
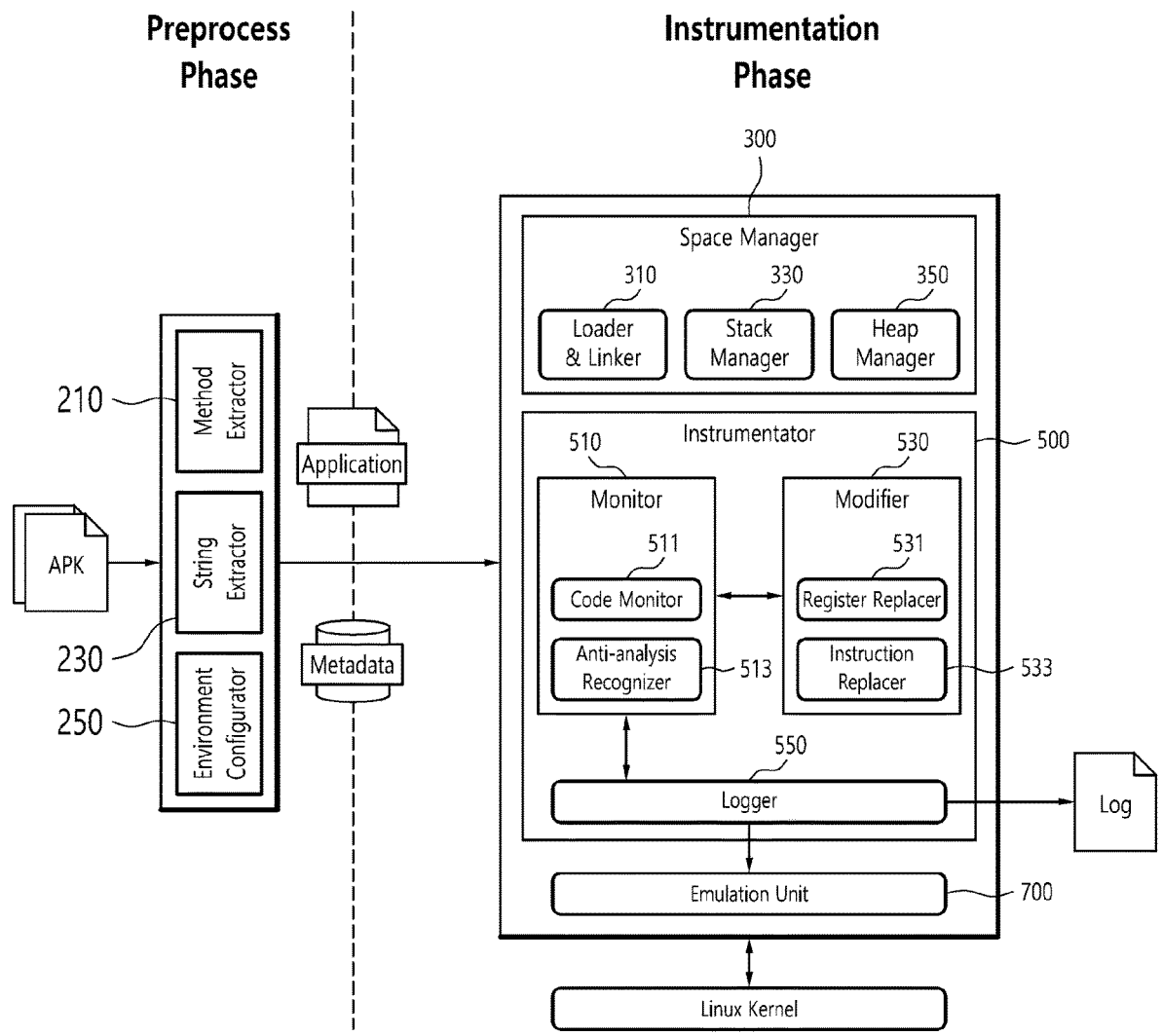
FIG. 3 is a detailed configuration diagram of a process wrapping device for bypassing native code anti-analysis according to an embodiment of the present disclosure.

FIG. 3 is a detailed configuration diagram of the process wrapping device for bypassing native code anti-analysis according to an embodiment of the present disclosure.

Referring to FIG. 3, the proposed scheme works in largely two phases. The first phase is a preprocess phase, and the second phase is an instrumentation phase.

First, in the preprocess phase, necessary metadata is extracted based on installed information of an application to be analyzed. Subsequently, process wrapping is performed and an environment variable is set to allow the application to run on the analysis tool.

At the point in time when the application is installed, ART creates an OAT file using dex2oat. The native code of the OAT file is directly executed through the CPU in the previously compiled binary format. Since the code of DEX is compiled into the code of OAT, the code of OAT runs in a similar way to the code of DEX, and although compiled, accesses and refers to information of the DEX file which manages symbols.

Accordingly, it is impossible to identify symbol information such as method name and string using only the execution code of the OAT file. To solve this problem, information in the DEX file inside the OAT file is extracted during pre-processing to allow the analysis tool to easily refer to information about symbols.

When the oatdump tool in Android is used, it results in all method and string information in the OAT file, bytecode matching each method and compiled native code. When this information is parsed, all method and string information used in the application may be obtained to create metadata.

The address of all methods and code outputted as a result of oatdump is based on the start address specified in the OAT file. Since the address is not identical to an address in which the code is loaded in the actual process, the corresponding address is not directly used, and offset is used. When mapping information is built based on the offset, the actual start address of method is identified using an address in which the program image is loaded in the memory when the application runs.

Accordingly, the method metadata extractor 210 generates mapping information using metadata necessary to identify the running method based on the offset. The generated mapping information is as shown in FIG. 4.

In general, since most of information except library routine is determined when compiling, the native code does not need metadata such as descriptor, and an amount of information included in object code is small. However, the OAT file as a result of compiling the DEX file includes similar codes to those running in the virtual machine to provide the logically same result as the execution result in Dalvik virtual machine. This feature is prominent in the case of string.

For example, in the case of a general ELF file running in Linux, string is mapped in .rodata section, and when running, reads string by directly referring to information of the address of the corresponding section. However, an OAT file accesses string based on ID. A unique ID is allocated to each string and a DEX file distinguishes the strings using the unique ID.

Since the native code of the OAT file is a result of compiling the activities of the DEX file, it manages string using the unique ID in the same way as the DEX file that refers to string. Accordingly, it refers to using the string ID, not directly accessing the address. Due to this difference, to identify string information before execution, it is necessary to access the DEX file to search for the ID or identify string information mapped to each ID before.

A string metadata extractor 230 extracts the actually used string by dynamically monitoring the string reference activity, but extracts string mapped to each unique ID as metadata by pre-processing to use in combination with static analysis information.

Simply when the analysis tool directly calls MainActivity of the application, it is impossible to normally run the application. It is because lots of libraries and framework codes necessary for the application to normally run are usually loaded through zygote. However, when the application is executed using zygote, it is difficult for the analysis tool to take all control over process, and for debugging, a separate debugging module provided by the framework or the application is necessary.

To take control over process without using an additional module, Android uses a WrapperInit mode provided to allow a separate program to run before the application runs. Using the WrapperInit mode of app_process, an environment configurator 250 first executes a predefined wrapper process and loads classes and resources necessary to run the application. In this instance, when the analysis tool has a separate execution module, the analysis tool takes all control over the execution of the application by directly transmitting the instruction necessary for the analysis tool through script.

Figure 5:
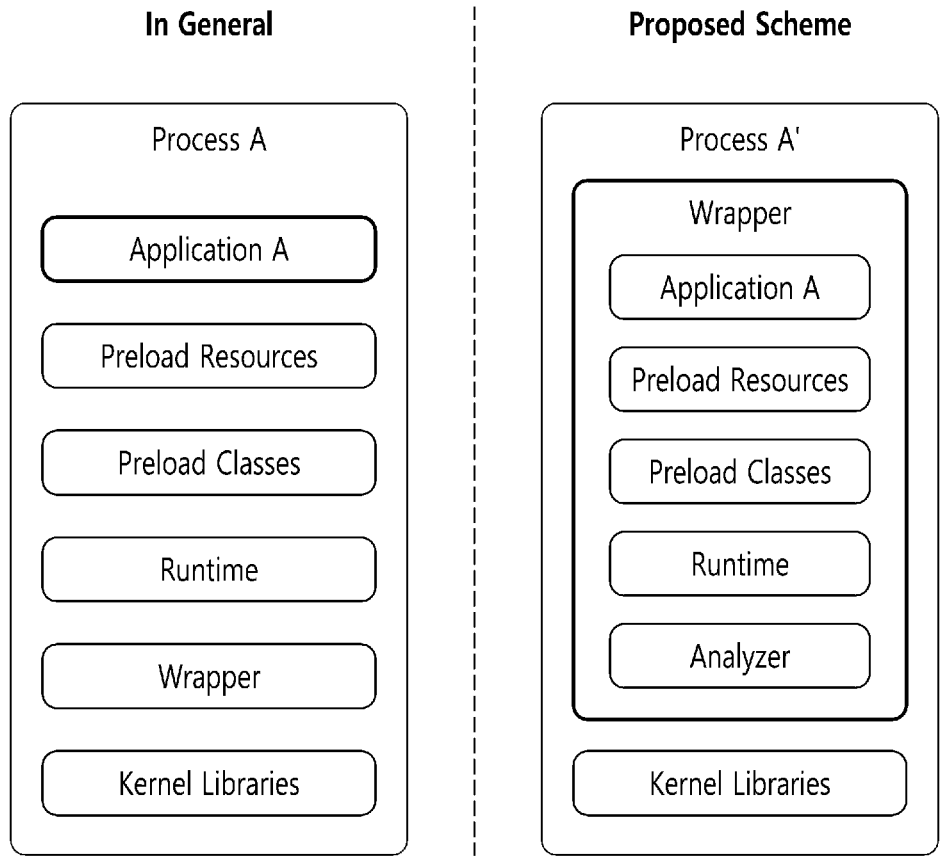
FIG. 5 is a diagram showing general application execution and execution through wrapping having its own execution module.

FIG. 5 is a diagram showing general application execution and execution through the wrapper having its own execution module.

The general wapperInit mode functions to execute a program wrapped before Preload Classes loading, while program wrapping with a separate execution function takes control over all activities of app_process as shown in FIG. 5.

Accordingly, when Analyzer modules that store the codes necessary for analysis necessary for Wrapper to work are loaded first, app_process is executed according to the general execution procedure of zygote, and then the application is executed, the logically identical result to the result of executing through zygote may be obtained.

The analysis tool takes control over app_process and all loaded libraries through wrapping, and it is possible to instrument JNI code that was impossible at the existing bytecode level of instrumentation. The bytecode level of instrumentation such as DexMonitor instruments only the instruction that is executed through the Dalvik virtual machine, and JNI code runs when the native code which is the compiled result directly runs.

That is, the bytecode level of instrumentation fails to instrument the native code used in the application including JNI code. When the bytecode level of instrumentation is used, only the called time of JNI method and the terminated and returned result are identified. When only the called time and the return time are identified, all about the activity that produce the result after JNI method is called remain as Black-Box.

However, when the native level of instrumentation is performed by wrapping all necessary to run the application, it is possible to instrument all native codes including JNI code. That is, it is possible to instrument all remaining as Black-Box at the existing bytecode level of instrumentation and identify the execution flow of all library codes used in the application.

In addition, since the proposed scheme is performed through wrapping, in case where other analysis tool is executed when running the application, the proposed scheme avoids the environmental feature that occurs when other analysis tool analyzes the application so that the analysis tool is not detected.

When the preprocess phase is completed, the application is executed using the Valgrind based instrumentation tool. The instrumentation tool of the present disclosure may be directly performed through the Linux kernel without the help of Dalvik virtual machine or Android runtime.

A space manager module 300 and an emulation module 700 involved in running the program are responsible for managing the memory such as stack and heap and loading and linking, and play a role in transmitting the instruction to the CPU according to the instrumentation result. That is, the space manager module 300 and the emulation module 700 are responsible for the actual execution of the application entered as an input value.

An instrumentator module 500 plays a role in monitoring and controlling the flow of the program by instrumenting the actual code and if necessary, modifying or deleting. In this instance, the metadata created by pre-processing is used and the instrumented result is extracted in the log format.

When the wrapped application runs, the space manager module 300 and the emulation module 700 function to control the execution process like normal application execution flow by loading libraries necessary for instrumentation and executing app_process. The app_process is a normal step that is essential before the application runs, and takes control over the application while avoiding Android framework modification by running the application through app_process.

The space manager module 300 largely includes a loader & linker module 310, a stack manager module 330 and a heap manager module 350.

The loader & linker module 310 performs a task of loading and linking libraries necessary to execute the program, and the stack manager module 330 and the heap manager module 350 manage spaces used in the app_process and the application. All libraries necessary for instrumentation and analysis are loaded through the corresponding module, and instrumentation starts from the execution of app_process.

The emulation module 700 plays a role in actually executing the program based on the result of the emulation module 700 as described below. When the application runs through wrapping, the analysis tool and the application are simultaneously executed in one process, so it is necessary to manage to prevent their results from affecting each other.

Accordingly, virtual stack and heap are made using the space manager module 300 to store the execution of the application, and the analysis tool uses the stack and heap allocated by the system. In this instance, actual computation is performed through the register of the CPU, and the space manager module 300 plays a role in periodically updating the CPU registers to prevent them from affecting each other.

The space manager module 300 and the emulation module 700 that manage the execution of the program may be implemented using a dynamic binary instrumentation framework. The dynamic binary instrumentation framework provides the corresponding function to the space manager module 300 and the emulation module 700 to allow them to use the function.

When Valgrind is used as the dynamic instrumentation framework, since Valgrind itself implements and uses all library methods, without using standard libraries, it is possible to easily manage the space for all libraries used in the application without being greatly influenced by the kernel version.

The instrumentator module 500 is a module that instruments the actual code of the app_process and the application and manages the execution flow of the program. The instrumentator module 500 is divided into 3 modules, a monitor module 510, a modifier module 530 and a logger module 550, on the basis of operation.

The monitor module 510 includes a code monitor module 511 and an anti-analysis recognizer module 513, and the code monitor module 511 is implemented using the VEX module of Valgrind. The code monitor module 511 performs a task of translating the native code compiled to be executed into IR and IRs are managed by the unit of Basic Block (BB).

Figure 6:
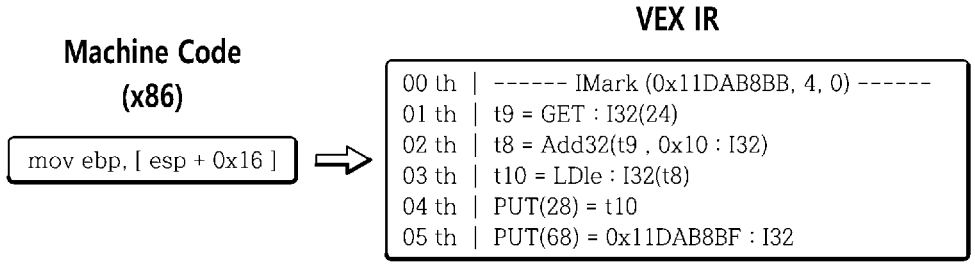
FIG. 6 is a diagram showing the conversion of Mov ebp, [esp+16] instruction to IR.

FIG. 6 is a diagram showing the conversion of Mov ebp, [esp+16] instruction to IR. IR makes and uses an internal temporary variable on its own, and one IR is mapped to one computation. Accordingly, one instruction may be a plurality of instructions according to the instruction. The number in the parentheses of GET/PUT IR used in IR is different depending on the CPU architecture. The IMark statement stores the address and length of the instruction and the following IRs are as below.

1. Store a value of ESP register in t9.
2. Add 16 to t9 and store in t8
3. Store, in t10, a value pointed by the address stored in t8.
4. Store the value of t10 in EBP.
5. Insert an address of instruction to be executed next into EIP.

A Basic Block (BB) is based on branch, and one or more BBs form one method. In conditional statement such as iterative statement, a specific BB may be executed multiple times, and VEX generates and executes one BB and generates the next BB according to the result value of the previous BB.

Figure 7:
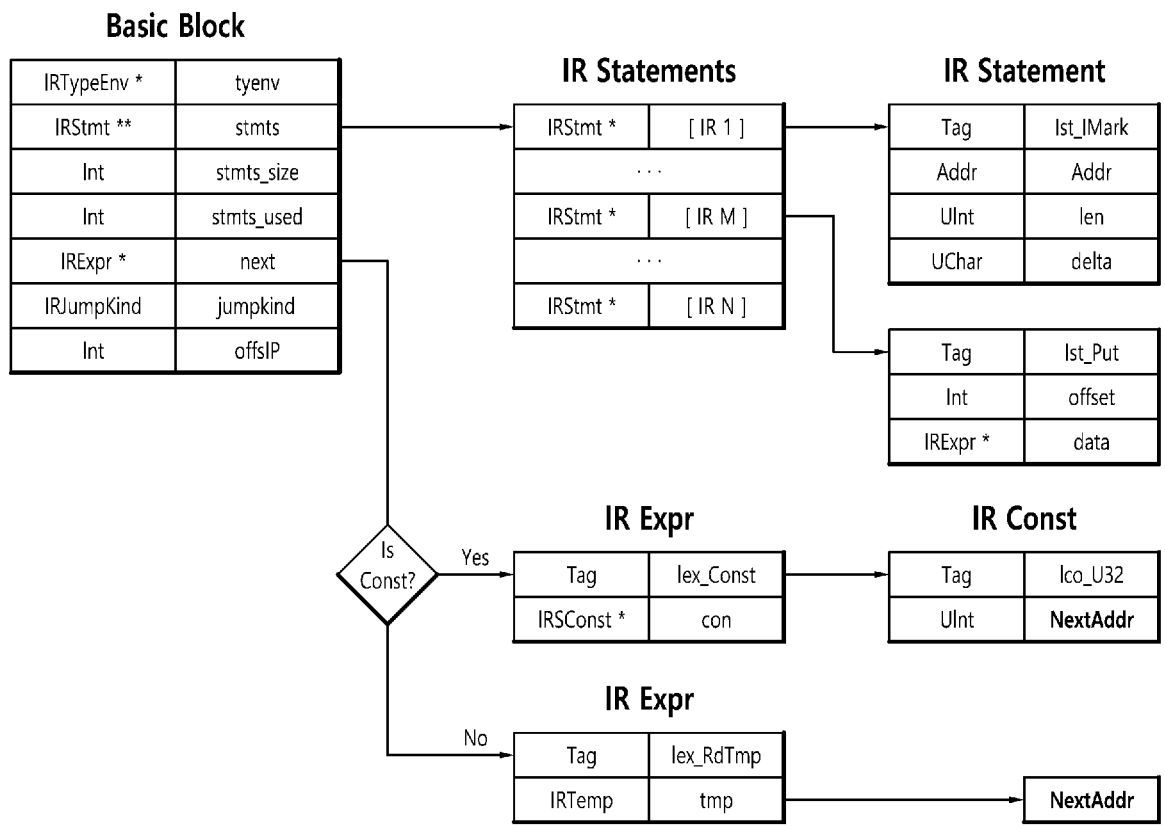
FIG. 7 is a diagram showing the structure of a basic block used in VEX.

FIG. 7 shows the structure of the basic block used in VEX. One BB has IR statements corresponding to the plurality of instructions until the branch is generated, and each IR is distinguished by Tag. For a BB to find the next BB, there are two ways. When an address intended to branch is a constant value, the corresponding value becomes the start address of the next BB, and when the address is not a constant value, the execution result of the corresponding BB is stored in a temporary variable and the result value of the corresponding temporary variable becomes the start address of the next BB.

The anti-analysis recognizer 150 performs a function of checking the anti-analysis techniques. The checking is performed based on signature, and the used signature may be the string used in the instruction, the method name of the current BB or the next BB, the library used or a set of instructions of a specific sequence. Information about the string to be used in the application and the method name to call reveals which method is being executed and which string is being used through the previously created metadata.

Using this, anti-analysis techniques are detected by comparing with signatures such as string and method name, used in a malicious application. When anti-analysis technique is detected, a bypassing method of the corresponding anti-analysis technique is selected, and the corresponding information is transmitted to the execution code modifier 170. In this instance, since method which dynamically fetches string or returns string is affected by the execution result, when only the existing statically extracted metadata is used, it is impossible to find the string. Accordingly, a dynamic analysis function for string is additionally necessary.

Figure 8:
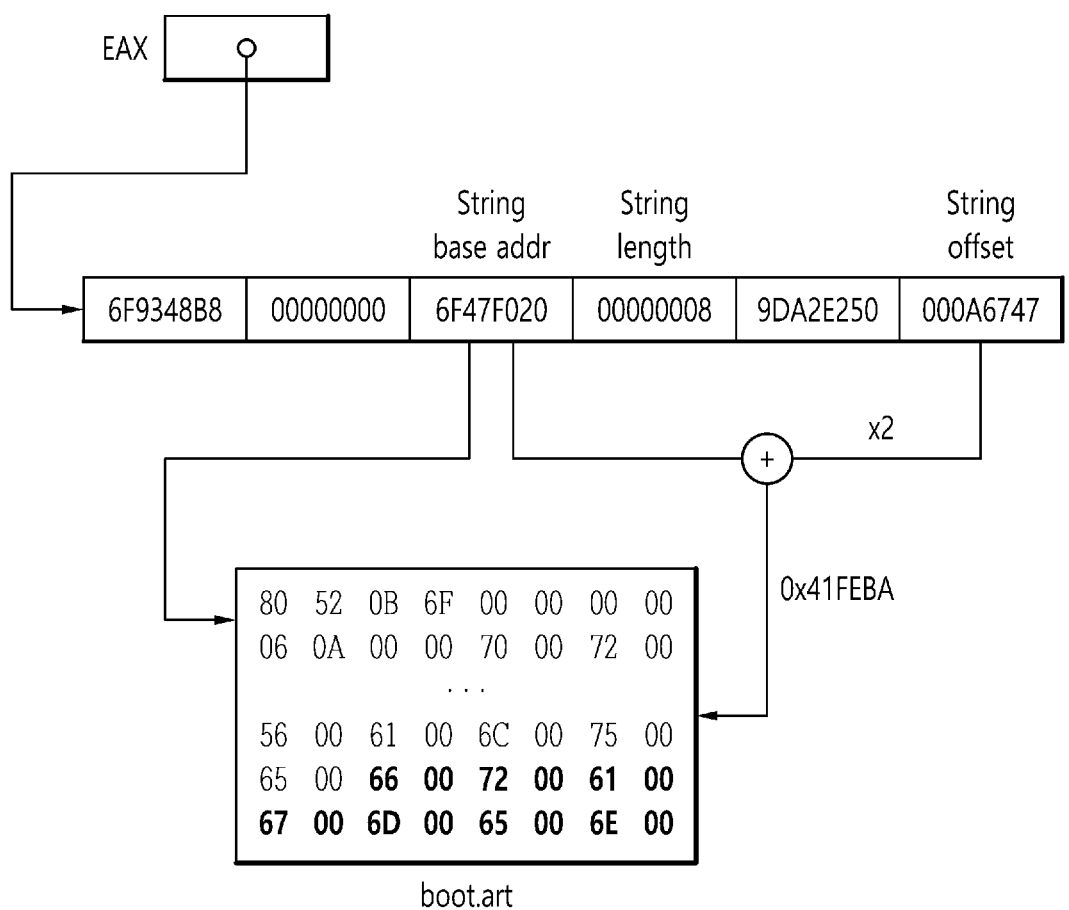
FIG. 8 is a diagram showing the structure of a compiled string used in OAT.

FIG. 8 shows the structure of the compiled string used in OAT. This entry indicates a result value of executing the method of ART to find string or an entry pointed by EAX register when Java/lang/String is returned. One entry is 24 bytes and 8-11 bytes indicate the reference address of string.

It indicates a specific part of boot.art file or a dynamic space used by ART, and when it indicates the dynamic space, it directly indicates string, and when it indicates a specific of boot.art file, it is necessary to find the position of string through offset. In Android, string is managed as Unicode, not ASCII, so each character is 2 bytes, and when finding the address, offset is multiplied by 2 and added to the reference address.

The found result points to the actual string, and the string may be identified by reading as much as the string length stored in 12-15 bytes of string entry. The modifier module 530 is a module which inserts IR that bypasses the anti-analysis technique detected by the monitor module 510.

Since the actual instruction is changed by changing IR, the program produces a result that is different from the previous result. There are two ways to change the execution flow through IR. The first one is to manipulate the instruction through an instruction replacer 533. The instruction may be changed by converting an additional instruction to IR and inserting between instructions, or changing the constant value stored in the instruction, and through this, the execution flow may be changed.

Figure 9:
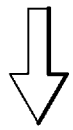
FIG. 9 is a diagram showing the translation of [cbz] instruction into IR as an example of IR modification through constant value change.

FIG. 9 shows the translation of [cbz] instruction into IR as an example of IR modification through constant value change. The [cbz] instruction is an instruction which determines the branch by comparing with 0, and in this instance, the execution is changed by changing the value of 0 to 1. The second one is to make a change to the register through a register replacer 531. In general, in the case of Intel CPU, the return value of method is stored in EAX or RAX register, and in the case of ARM CPU, the return value of method is stored in R0-R3 register.

In this instance, the return value of method may be easily changed by changing a value of a specific register after the return value is stored. The execution result of the instruction may be overlaid by inserting IR that changes the register value after the execution in the same way.

FIG. 10 shows a part of method implementing check for "su" binary, one of rooting detection techniques. When the corresponding method is executed, the same function as hooking of the corresponding method may be performed by deleting the existing IR, inserting 0 into EAX and modifying IR to run the termination instruction.

The termination instruction runs by finding the return instruction in the current binary file, and to execute the corresponding instruction after the instruction is written in the memory, the memory needs be authorized to execute, and in this instance, to avoid potential problems, the instruction in the existing binary is used. In the case of ARM CPU, bx lr, and in the case of Intel CPU, ret instruction, the instruction is found and branched to the corresponding address.

When a target to be bypassed through signature is set in this way, the execution flow may be changed by change the translated IR. It is possible to bypass the existing anti-analysis techniques with no need for a separate debugger or virtual machine and without framework modification. Additionally, since the code of anti-analysis techniques also reside in the instrumentation range, the code is instrumented, and it is possible to effectively analyze most of running codes by monitoring each instruction and recording the execution of the application.

Hereinafter, the experimental result for testing the effect of the present disclosure will be described. The proposed experimental environment setup scheme uses Intel® Core® i5-8500 3.00 GHz CPU and 16 GB RAM, and the operating system uses Ubuntu 18.04. To test the recognition and bypassing function of anti-analysis techniques, the experiment is performed using an emulator, and the Android emulator uses Android 5.1 x86 OS and Nexus5, and uses 1core 4 GB RAM.

The reason of using x86 operating system in which the instruction set of the compiled binary is changed, which may affect the result, is to make an environment as similar to the actual analysis environment as possible since the latest Android studio recommends using x86 emulator to improve the performance.

The performance of the proposed scheme is evaluated using malicious codes distributed on a network as experiment sample. The malicious code data used in the experiment uses Android Malware Dataset (AMD) provided by Argus group. Among them, the experiment was not performed on all malicious codes, and the experiment was performed on 233 malicious codes to which anti-analysis techniques were presumably applied by analysis performed previously.

FIG. 11 is a table showing a part of the signature of the anti-analysis technique of the bypassed malicious application detected using the proposed scheme.

It can be seen that since the applied technique is different for each APK, there is a slight difference in signatures, and not only signatures relevant to rooting detection such as "su", "/date/", "android.os.SystemProperties" but also emulator detection signatures such as "00000000000000", "Emulator" are detected.

FIG. 12 shows a part of anti-emulating code applied to the malicious application. The corresponding malicious application performs malicious behavior such as stealing information of SMS, MMS, call records, and steals card number, expiration date and CVC number. The method of the corresponding malicious application detects the emulator as below.

It calls getSystemService to retrieve information of the current device and checks if ID is "00000000000000". In the case of an emulator, since ID is set to "00000000000000", this is to check it, and subsequently, checks the signatures found in the emulator based on build information. When even any one is detected, the method runs in a manner of recognizing as an emulator.

The corresponding method is disallowed to identify the name of method due to the applied identifier transform and thus cannot perform detection based on the method name and detects the used string signature, so this method is determined as anti-emulating method.

FIG. 13 shows a part of log indicating the result of recognizing the strings used in the method determined by anti-emulating as signature and replacing the corresponding string by a different string at the time of resolving through ART. A part of the string "Emulator" is replaced by a different character, and after use, restored to the original string. This makes it impossible to normally recognize the signature to prevent the anti-emulator from detecting the emulator.

FIG. 14 shows a part of code running to steal information in the malicious application. This code does not run and is terminated when detecting the emulator, and runs only when it fails to detect the emulator. The corresponding method performs a task of sending SMS information or card information to a specific URL using JSON.

In the present disclosure, when the bypassing function is removed, logs of 6145164 bytes are extracted and information stealing code is not called to the corresponding logs, while when logs are extracted through the proposed scheme including the bypassing function, it can be seen that logs of 6221688 bytes are extracted and the method of the information stealing code runs.

FIG. 15 is a diagram showing a difference in log made by the corresponding method executed by the bypassing function.

In FIG. 15, the left side shows that there is no malicious behavior when monitoring the application without applying the bypassing function, while the right side shows that when anti-emulating techniques are disabled through the bypassing function, the codes that perform malicious behavior are still running at the point in time at which the execution should be terminated.

In the second section of FIG. 15, it can be seen that the method i.run( ) runs, this method is the same method as the method mentioned in FIG. 14 and is a method that performs personal information stealing behavior. Accordingly, it can be seen that when it detects the emulator, it does not perform malicious behavior, but when it does not detect the emulator, it performs malicious behavior.

Through this, it can be seen that there are malicious applications that evade analysis using anti-analysis techniques, and the proposed scheme forces the malicious applications to perform malicious behavior by disabling the anti-analysis techniques of the malicious applications. Using this, it is possible to efficiently analyze applications not classified as malicious although they are malicious applications.

To measure the performance overhead of the present disclosure, SciMark2 [Non-Patent Literature 1] benchmark application is used. SciMark2 is a benchmark for measuring the performance in the scientific and engineering application and indicates how well JVM, JIT perform algorithms given as benchmark. SciMark2 indicates the result in Millions of floating point operations per second (Mflops), implying how much real numerical computation can be performed for the unit time.

Figure 16:
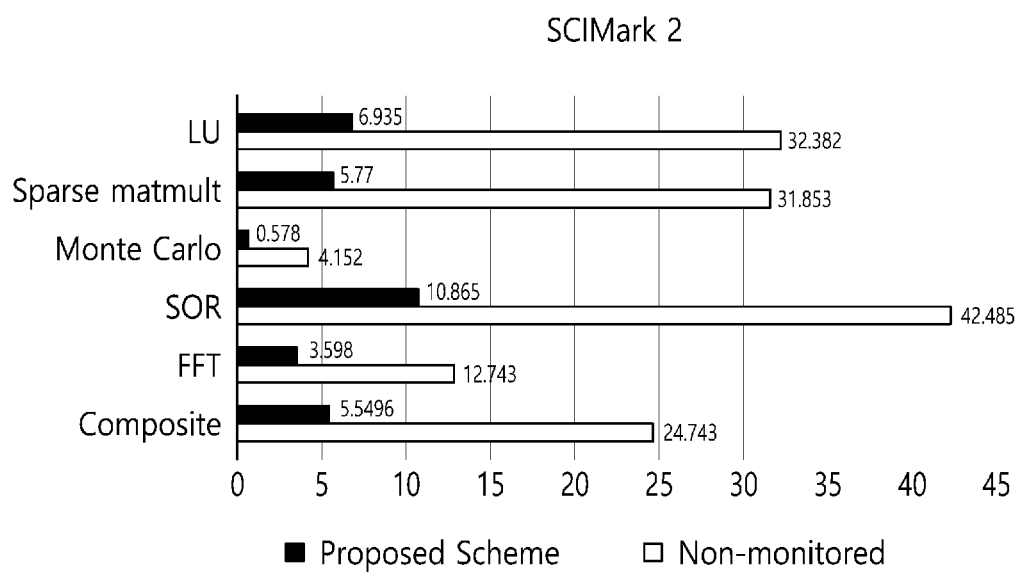
FIG. 16 is a diagram showing a measurement result of performance overhead of the present disclosure.

FIG. 16 is a diagram showing the result of measuring performance overhead of the present disclosure.

Since a larger number indicates that more computation per unit time can be performed, it may be interpreted that the lower the number, the larger the execution overhead. It can be seen that in the case of the present disclosure, overhead occurs about 3-7 times.

In the case of DexMonitor [Non-Patent Literature 2] which is an analysis tool of a similar type to the proposed scheme, when the same benchmark is used, overhead occurs about 40 times up to about 70 times, and in comparison to this, it can be seen that it runs fast about 12 times.

The overhead measurement results as function of the execution speed of the present disclosure, the general execution is 2.018 seconds, and the execution without logging according to the present disclosure is 18.297 seconds, and the execution with fully logging according to the present disclosure is 29.403 seconds.

The time until the application starts is measured, and after measuring 229 malicious codes, overhead is an average of results. Except in special cases, for a more accurate result, an average except top/bottom 5% is calculated. The overhead when extracting information of all instructions as logs and when targeted for bypassing and execution without separate log extraction amount to 14.5 times and 9 times, respectively.

In particular, since the experiment was performed in the emulator when a general application runs, it can be seen that the emulator is detected and immediately terminated without performing malicious behavior. Accordingly, when seeing multiple, it seems that the difference is to some extent, but there is a difference between the execution result without the proposed scheme and the experiment result through the proposed scheme.

When comparing the case of leaving all the execution instructions as logs and the case of not leaving separate instructions as logs, an additional I/O overhead of about 11 second occurs, and since the function may be selectively used if necessary, actually the execution speed overhead of about 9 times occurs. Likewise, in the case of DexMonitor, overhead of about 100 times occurs, and in comparison to this, it can be seen that it is very fast.

The existing analysis tools use a manner of modifying the framework or emulator source code or the analysis tools use a manner of attaching to process. The analysis tools are detected by the anti-analysis techniques and disabled or have the limited analysis range. These disadvantages imply that it is impossible to analyze malicious applications to which anti-analysis techniques are applied, thereby making it difficult to rapidly deal with malicious applications that evolve fast.

The present disclosure proposes to bypass the existing anti-analysis techniques by instrumenting the native code used by ART per instruction in a manner of wrapping the analysis tools. The scheme manages the signatures of the anti-analysis techniques using the database, and thus can be applied to the already analyzed technique without an additional task, and it can be used for general purposes without modifying the Android system or the application.

The proposed scheme is resistant to the existing anti-analysis techniques and provides an environment for efficient analysis of an application to be analyzed, thereby rapidly dealing with malicious applications that are created and evolve fast.

Figure 17:
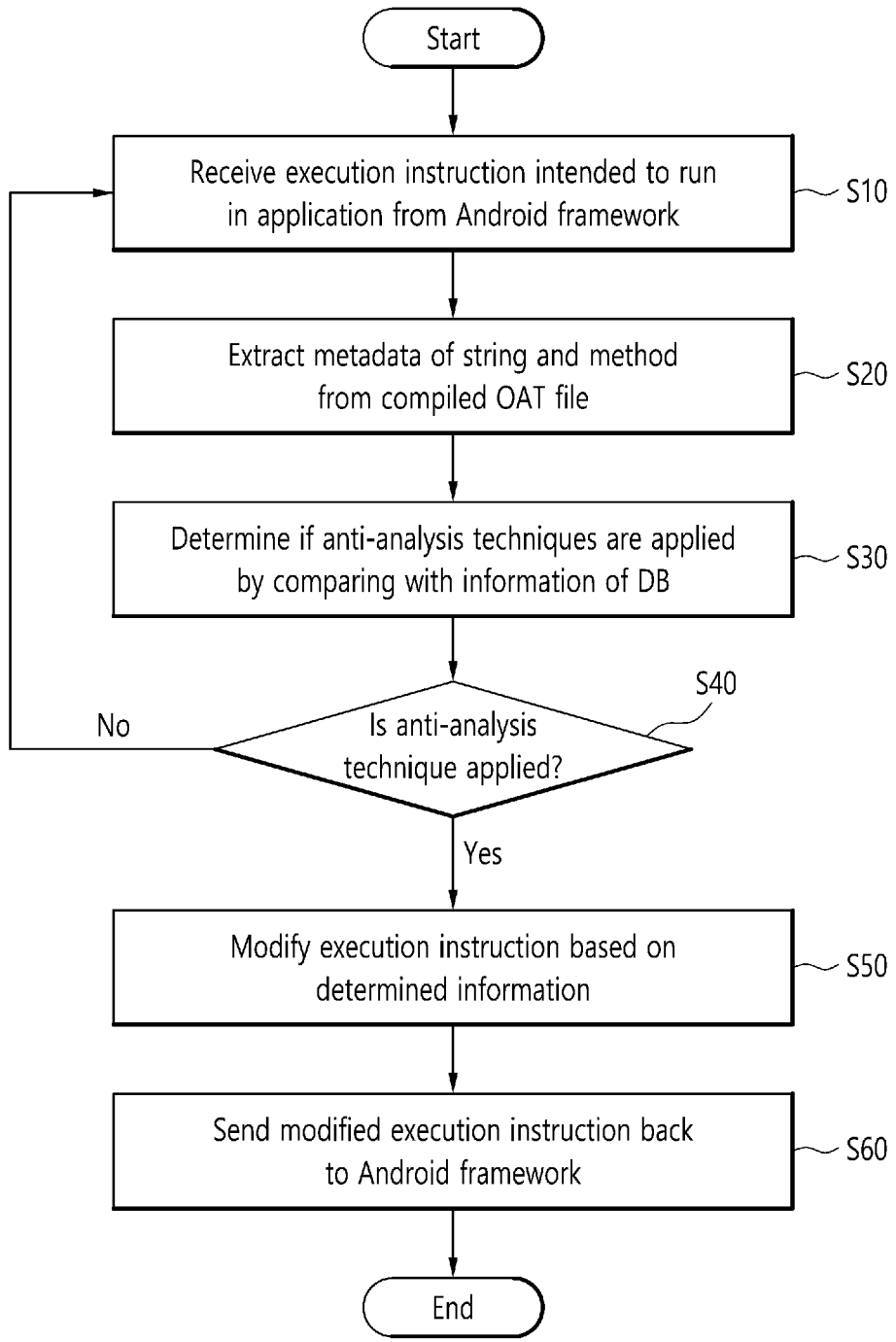
FIG. 17 is a flowchart of a process wrapping method for bypassing native code anti-analysis according to an embodiment of the present disclosure.

FIG. 17 is a flowchart of a process wrapping method for bypassing native code anti-analysis according to an embodiment of the present disclosure.

The process wrapping method for bypassing native code anti-analysis according to this embodiment may be performed substantially in the same configuration as the device 10 of FIGS. 1 and 2. Accordingly, the same reference sign is given to the same element as the device 10 of FIGS. 1 and 2, and repetitious descriptions are omitted herein.

Additionally, the process wrapping method for bypassing native code anti-analysis according to this embodiment may be performed by software (application) for performing the process wrapping for bypassing native code anti-analysis.

Referring to FIG. 17, the process wrapping method for bypassing native code anti-analysis according to this embodiment receives an execution instruction intended to run in an application from the Android framework when the application starts (S10).

In this case, the native code compiled to run is translated into IR, and the IRs may be managed per basic block (BB).

Metadata of string and method is extracted from the compiled OAT file using the oatdump tool in the Android framework (S20).

Determination is made as to whether anti-analysis techniques are applied by comparing with information of DB based on the transmitted execution instruction and the extracted metadata (S30).

In this case, the anti-analysis techniques may be detected by comparing signatures including the string used by the instruction, the method name of the current BB or the next BB and the library used or an instruction set of a specific sequence with signatures including string and method name used in malicious applications stored in the database.

When anti-analysis techniques are applied (S40), the execution instruction is modified based on the determined information (S50).

In an embodiment, the execution flow of the instruction may be changed by converting an additional instruction into IR and inserting between instructions or changing a constant value stored in the instruction.

In another embodiment, the execution flow of the instruction may be changed by inserting IR that changes a value of register after a return value of the method is stored or changes the register value after execution.

The modified execution instruction is sent back to the Android framework (S60).

In an embodiment, the present disclosure may further include pre-processing for extracting necessary metadata based on installed information of the application to be analyzed.

The pre-processing for extracting the metadata may include generating mapping information using metadata necessary to identify the running method based on offset, extracting strings mapped to each unique ID as metadata, and executing a predefined wrapper process and then loading classes and resources necessary to run the application.

According to the process wrapping method for bypassing native code anti-analysis of the present disclosure, it is possible to easily analyze malicious applications to which anti-analysis techniques are applied using the existing analysis system by creating an environment in which the anti-analysis techniques which make it difficult to use the existing analysis system are bypassed to run programs. Additionally, it is possible to reduce the time required to deal with the existing malicious applications but also new malicious applications.

The process wrapping method for bypassing native code anti-analysis may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

INDUSTRIAL APPLICABILITY

Ushering the era of IoT, tens of billions of IoT devices are widely spread and used. Smartphones responsible for connecting IoT devices plays a key role in providing a user centered service via communication with a plurality of sensors. Users handle many tasks in a convenient manner through smartphones, so a variety of personal information is stored and used in smartphones.

The present disclosure proposes a scheme for disabling the anti-analysis techniques by instrumenting the native code of an OAT file used in ART at the instruction level through process wrapping. The present disclosure provides an environment for effectively analyzing applications with resistance to a variety of anti-analysis techniques developed so far without modifying the Android framework, and it is expected to be usefully used in the smartphone market.

DETAILED DESCRIPTION OF MAIN ELEMENTS

10: Process wrapping device for bypassing native code anti-analysis
110: Execution code monitor
130: Symbol extractor
150: Anti-analysis recognizer
170: Execution code modifier
190: Database
210: Method metadata extractor
230: String metadata extractor
250: Environment configurator
300: Space manager module
310: Loader & linker module
330: Stack manager module
350: Heap manager module
500: Instrumentator module
510: Monitor module
511: Code monitor module
513: Anti-analysis recognizer module
530: Modifier module
531: Register replacer
533: Instruction replacer
550: Logger module
700: Emulation module

The invention claimed is:

1. A process wrapping method for bypassing native code anti-analysis, the process wrapping method comprising:
receiving, from an Android framework, an execution instruction configured to run in an application when the application starts;
extracting metadata of string and method from a compiled OAT file using an oatdump tool in the Android framework;
determining if an anti-analysis technique is applied by comparing with information of a database based on the received execution instruction and the extracted metadata;
modifying the execution instruction when the anti-analysis technique is determined to be applied;
transmitting the modified execution instruction back to the Android framework; and
preprocessing by extracting necessary metadata based on installed information of the application to be analyzed,
wherein the preprocessing by extracting the necessary metadata comprises,
generating mapping information using the metadata necessary to identify a running method based on offset;
extracting the string mapped to each unique ID as the metadata; and
executing a predefined wrapper process and then loading classes and resources necessary to run the application.

2. The process wrapping method of claim 1, wherein the receiving the execution instruction from the Android framework comprises translating native code compiled to run into IR and managing the IRs per basic block.

3. The process wrapping method of claim 2, wherein the determining if the anti-analysis technique is applied comprises detecting the anti-analysis technique by comparing a signature including a string used in an instruction, a method name of a current basic block or a next basic block, and a used library or an instruction set of a specific sequence with a signature including string and method name used in a malicious application stored in the database.

4. The process wrapping method of claim 1, wherein the modifying the execution comprises changing an execution flow of the execution instruction by converting an additional instruction into IR and inserting between instructions or by changing a constant value stored in the execution instruction.

5. The process wrapping method of claim 1, wherein the modifying the execution instruction comprises changing an execution flow of the execution instruction by inserting IR that changes a value of a specific register after a return value of the method is stored or changes the value of the specific register after execution.

6. A non-transitory computer-readable storage medium having recorded thereon a computer program for performing a process wrapping method for bypassing native code anti-analysis, wherein the process wrapping method comprises:
    receiving, from an Android framework, an execution instruction configured to run in an application when the application starts;
    extracting metadata of string and method from a compiled OAT file using an oatdump tool in the Android framework;
    determining if an anti-analysis technique is applied by comparing with information of a database based on the received execution instruction and the extracted metadata;
    modifying the execution instruction when the anti-analysis technique is determined to be applied;
    transmitting the modified execution instruction back to the Android framework; and
    preprocessing by extracting necessary metadata based on installed information of the application to be analyzed,
    wherein the preprocessing by extracting the necessary metadata comprises,
    generating mapping information using the metadata necessary to identify a running method based on offset;
    extracting the string mapped to each unique ID as the metadata; and
    executing a predefined wrapper process and then loading classes and resources necessary to run the application.

7. A process wrapping device for bypassing native code anti-analysis, the process wrapping device comprising:
    an execution code monitor configured to receive, from an Android framework, an execution instruction intended to run in an application when the application starts, and to transmit a modified execution instruction back to the Android framework;
    a symbol extractor configured to extract metadata of string and method from a compiled OAT file using an oatdump tool in the Android framework;
    an anti-analysis recognizer configured to determine if an anti-analysis technique is applied by comparing with information of a database based on the execution instruction received by the execution code monitor and the metadata extracted by the symbol extractor;
    an execution code modifier configured to modify the execution instruction when the anti-analysis technique is determined to be applied to the execution instruction by the anti-analysis recognizer and to transmit the modified execution instruction to the execution code monitor,
    wherein the symbol extractor comprises:
    a method metadata extractor configured to generate mapping information using metadata necessary to identify a running method based on offset;
    a string metadata extractor configured to extract the string mapped to each unique ID as the metadata in preprocessing; and
    an environment configurator configured to execute a predefined wrapper process and then to load classes and resources necessary to run the application.

8. The process wrapping device of claim 7, further comprising:
    a space manager module and an emulation module configured to handle memory management and a loading and linking process and to perform a role in transmitting an instruction to a central processing unit (CPU) according to an instrumentation result.

9. The process wrapping device of claim 8, wherein the space manager module comprises:
    a loader & linker module configured to perform a task for library loading and linking necessary to run a program; and
    a stack manager module and a heap manager module configured to manage spaces used in app_process and the application.

10. The process wrapping device of claim 7, wherein the execution code monitor is further configured to translate native code compiled to run into IR and to manage the IRs per basic block.

11. The process wrapping device of claim 10, wherein the anti-analysis recognizer is further configured to detect the anti-analysis technique by comparing a signature including a string used in an instruction, a method name of a current basic block or a next basic block, and a used library or an instruction set of a specific sequence with a signature including string and method name used in a malicious application stored in the database.

12. The process wrapping device of claim 7, wherein the execution code modifier comprises an instruction replacer configured to change an execution flow of the execution instruction by converting an additional instruction into IR and inserting between instructions or by changing a constant value stored in the execution instruction.

13. The process wrapping device of claim 7, wherein the execution code modifier comprises a register replacer configured to change an execution flow of the execution instruction by inserting IR that changes a value of a specific register after a return value of the method is stored or changes the value of the specific register after execution.

* * * * *